Dec. 8, 1959 H. V. KRAUTWURST 2,916,596
CIGAR LIGHTER AND MOUNTING THEREFOR
Filed July 1, 1957

INVENTOR.
Homer V. Krautwurst
BY
R. F. Barnard
ATTORNEY

United States Patent Office 2,916,596
Patented Dec. 8, 1959

2,916,596

CIGAR LIGHTER AND MOUNTING THEREFOR

Homer V. Krautwurst, Rochester, N.Y., assignor to General Motors Corporation, Detroit, Mich., a corporation of Delaware Application July 1, 1957, Serial No. 669,182

7 Claims. (Cl. 219—32)

The present invention relates to cigar lighters and, in particular, to means for mounting a cigar lighter assembly in a substantially recessed but accessible position with respect to a support panel such as a vehicle dashboard.

Cigar lighter assemblies of the type herein contemplated normally include a substantially cylindrical or tubular holding case having a deep well or cavity into which an igniting unit is removably insertable. The holding case and igniting unit include, respectively, fixed and movable contact latch members which are engageable to energize an igniting circuit from a suitable source of electrical energy through a heating element carried by the igniting unit to ground. One of the contact latch members may be formed of a temperature responsive bimetallic element to automatically release upon the heating element reaching a predetermined temperature for use. Ejection means normally including a compressed spring then operates to thrust the igniting unit outwardly of the holding case to what may be termed a "holding" position. At this time, the igniting unit handling knob is readily accessible for removal of the igniting unit for use. It should also be noted that in assemblies of the type herein contemplated, the "holding" position aforementioned is also the position in which the igniting unit is normally maintained in the holding case prior to energization of the igniting circuit.

In recent years, the general public has become very style conscious with respect to automotive vehicles and, at the same time, extremely interested in the efforts of automotive manufacturers to incorporate as many safety features as possible into their respective vehicles. In the course of their investigation of various safety features for incorporation into their vehicles, these manufacturers have observed that many serious accidents result by reason of the vehicle occupants being thrown against protruding instruments or devices mounted on or adjacent the vehicle panel. Accordingly, it is desirable to design the interior of an automotive vehicle to be pleasing in appearance from a styling standpoint, while at the same time incorporating as many safety features therein as possible. Therefore, it is deemed desirable to mount various accessory controlling knobs and, in particular, a cigar lighter in an unobtrusive position in which the danger of injury from striking it may be materially reduced, if not entirely eliminated.

Therefore, in accordance with one general object and feature of this invention, it is intended to provide a cigar lighter assembly of the type aforementioned with a mounting means in which the igniting unit handling knob is normally recessed within a cavity formed behind the vehicle instrument panel, but which is readily accessible for use.

Moreover, it is a more specific object and feature of this invention to provide a cigar lighter assembly of the type comprising a holding case and igniting unit removably insertable therein, and a mounting structure therefor which includes an instrument panel and relatively large cavity into which the handling knob of the igniting unit may be recessed substantially flush with the instrument panel when in its normal "holding" position, there being provided a movable closure member surrounding the handling knob and normally maintained flush with the latter and the instrument panel, but which may be reciprocated axially in grasping the handling knob for use.

These and other features, objects and advantages of this invention will become more apparent hereinafter as the description of the invention proceeds relative to a preferred embodiment shown in the accompanying drawings in which.

Figure 1:
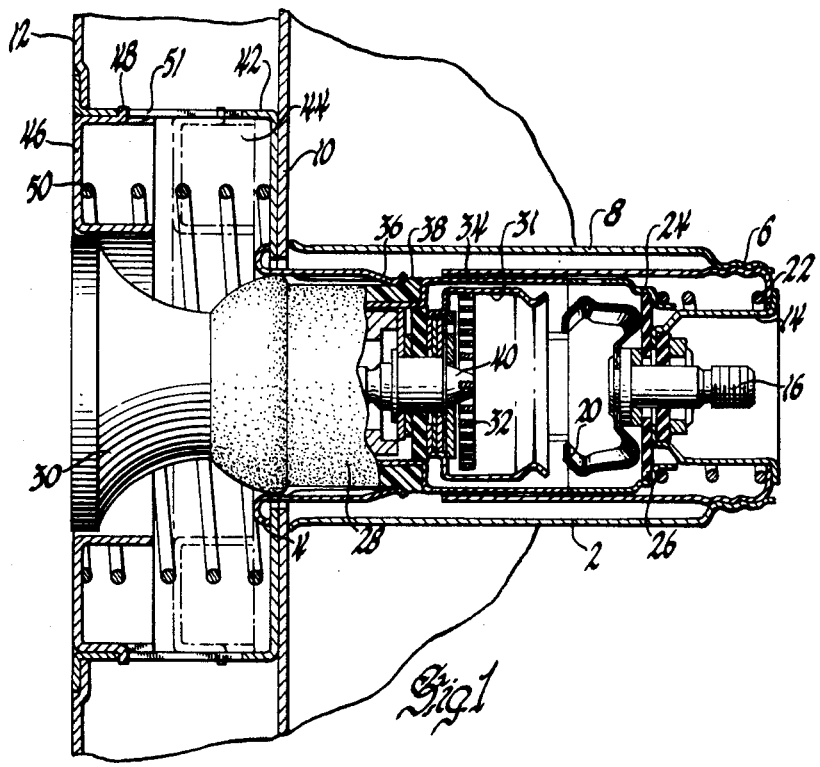
Figure 1 is a cross section of the lighter and mounting therefor of this invention.
Figure 2:
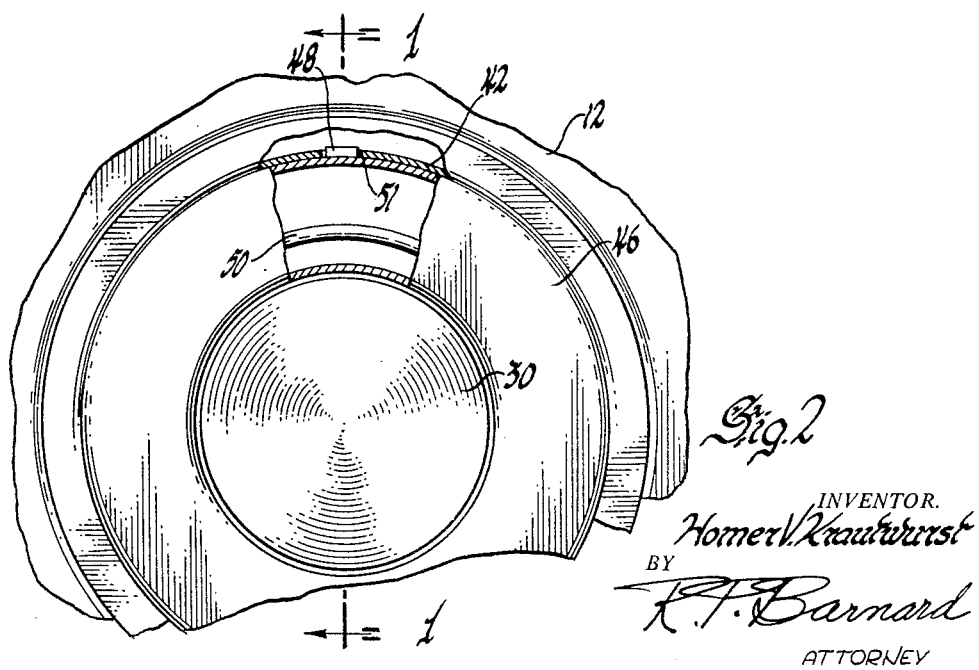
Figure 2 is a view of the knob end of the assembly with a portion of the assembly broken away to aid in the understanding thereof.

In the drawings, there is shown a preferred form of this invention as practiced with a cigar lighter assembly of the general type shown in the copending application of Clarence H. Jorgensen and Donald G. Dening, S.N. 375,318, filed August 30, 1953, now U. S. Patent No. 2,828,400, issued March 25, 1958. The cigar lighter assembly includes a holding case or receptacle 2 having an outwardly extending annular flange 4 surrounding an access opening into the interior of the case. The holding case includes a portion for threadably engaging at 6 a similarly formed portion on the rearwardly extending end of the locking sleeve 8 which holds the flange 4 against the support panel 10 which is spaced behind or formed as a part of the instrument panel 12. Rigidly secured by any suitable means such as soldering or the like to the rearmost end of the holding case 2 is a cylindrical cup 14 forming in part a housing for the terminal 16 which carries at its opposite end a fixed contact or latch member 20. The latch member 20 may be formed of a bimetallic or other temperature responsive material for a purpose to appear more fully hereinafter. As will appear clearly from the drawings, suitable washers and insulating members are employed to conduct current from a suitable source of electrical energy, such as a vehicle battery, through the terminal member 16 to the fixed latch member 20. An ejector spring 22 is disposed about the cup 14 within the case 2 and engages the end of an ejector cup 24 normally urging it to the left in Figure 1 as limited by engagement of this cup with an annular washer member 26 disposed about the terminal 16.

The igniting unit includes a body portion 28 rigidly secured to the handling knob 30 and on which there is secured a movable contact and latch member in the form of a cup or shield member 31 surrounding the heating element 32. This cup and heating element construction is in turn surrounded by an outer shell or shield 34 secured to the lighter body portion 28. One or more resilient fingers 36 may be formed on the holding case for abutment with an annular shoulder 38 formed on the main body portion of the igniting unit to maintain the latter in a normal or "holding" position within the lighter case when not in use or after being heated for use.

It will be appreciated that the heating element 32 is suitably secured in the usual manner to the inner wall of the contact cup 31 and secured to the central portion of the stud 40 to form an electrical circuit through the element upon engagement of the latch members 20 and 31 upon manual depression of the unit into the case. Furthermore, as taught in the aforementioned copending application, with the latch members engaged a circuit will be established through the heating element to heat it to a predetermined temperature at which time the contact member 20 will release the contact member 31 and the ejector mechanism will thrust against the sleeve 34 to move the igniting unit to the position shown in Figure 1 for use.

An annular wall or a plurality of bracket members 42 extend between the panel 10 and the instrument panel 12 to define a cavity or opening 44 entirely surrounding the handling knob 30 of the igniting unit. An annular ring or closure member 46, herein shown as being U-shaped in cross section, is adapted for mounting in the opening defined between the outer portion of the handling knob and the instrument panel, suitable stop means such as the radial fingers 48 riding in slots 51 in the member 42 being provided to limit outward movement of the closure member. A spring 50 is then placed in abutting engagement with the member 42 or directly against the support panel 10 and engages the base portion of the substantially U-shaped annular closure ring 46 to urge it outwardly of the cavity as limited by the stop means, whereby it will be normally maintained substantially flush with the instrument panel.

Therefore, it will be seen that a conventional lighter construction may be mounted with the handling knob thereof substantially flush and radially inwardly spaced from the vehicle instrument panel 12. The annular closure ring 46 covers the annular opening between the handling knob 30 and panel 12 in a manner so that all three are in a normal flush position. If it is intended to use the lighter, the operator merely depresses the outer portion of the handling knob to engage the latch members aforedescribed for the heating cycle. Upon the unit being heated for use, it will be ejected to the holding position in which the handling knob is again substantially flush with the closure member 46 and the instrument panel 12. Then, as the operator reaches in the usual manner for the handling knob, he will depress the closure member against the action of the spring 50 whereby he may grasp the handling knob to remove the latter for use.

It will now be appreciated that the subject construction provides a very simple and relatively inexpensive solution to the problem of a cigar lighter or other member projecting from the usual instrument panel of a vehicle. However, other forms of this invention will be obvious to those skilled in the art and, therefore, it should be emphasized that the specific embodiment of the invention shown has been selected merely for illustrative and explanatory purposes, and is not in any way intended to limit the scope of this invention which is defined by the claims which follow.

I claim:

1. A mounting for a cigar lighter assembly of the type comprising a holding case and igniting unit removably insertable therein, said unit including a handling knob projecting from said case, said mounting comprising support means for said case defining a chamber surrounding said knob, a closure for said chamber, and means for mounting said closure for movement relative to said knob.

2. A mounting for a cigar lighter assembly of the type comprising a holding case and igniting unit removably insertable therein, said unit including a handling knob, said mounting comprising support means for said case and an annular chamber surrounding said knob, a closure for said chamber, and resilient means for mounting said closure for movement relative to said knob.

3. A cigar lighter assembly and mounting therefor including a panel having an access opening therein, said assembly comprising a holding case, an igniting unit including a handling knob removably insertable in said case, means for fixedly supporting said case whereby said knob is recessed in said opening and radially spaced from said panel, and an axially movable member mounted around said unit between the latter and said panel.

4. A cigar lighter assembly and mounting therefor including a panel having an access opening therein, said assembly comprising a holding case, an igniting unit including a handling knob removably insertable in said case, means for fixedly supporting said case whereby said knob is recessed in said opening and radially spaced from said panel, an axially movable ring mounted around said unit between the latter and said panel, spring means urging said ring toward said panel, and stop means limiting movement of said ring whereby the latter is maintained flush with said panel.

5. A mounting for a cigar lighter assembly of the type comprising a holding case and igniting unit removably insertable therein, said mount including a panel having an access opening therein, means for fixedly mounting said holding case relative to said panel and the opening therethrough, said panel and mounting means forming a cavity surrounding the open end of said case, the mounting of said case being such relative to the position of said panel whereby the igniting unit is recessed within said cavity when inserted in said holding case, a closure member mounted within said cavity substantially flush with said panel and surrounding said igniting unit, and means for mounting said closure member whereby the latter may be reciprocated axially relative to said igniting unit to expose the latter for use.

6. A cigar lighter assembly and mounting therefor comprising a holding case, a support panel, means for supporting said case on said panel, a cover panel spaced from said support panel and having an access opening therethrough to said case, an igniting unit including a handling knob removably insertable into said case through said opening, means for retaining said unit in said case with said knob substantially flush with and radially inwardly spaced from said cover panel within the access opening of the latter, a movable closure member positioned between said knob and cover panel within said opening, and means for movably mounting said closure member within said opening to expose said knob.

7. In combination, a support panel, a cover panel spaced from said support panel, a cigar lighter assembly including a handling case and igniting unit removably insertable therein, said unit including a handling knob, means for mounting said assembly on said support panel whereby said knob is disposed in part between said panels and radially inwardly spaced from said cover panel to form a chamber therewith, a closure member disposed about said knob within said chamber and substantially flush with said cover panel, and means for mounting said closure member whereby it may be moved into the space between said panels to expose said handling knob.

References Cited in the file of this patent

UNITED STATES PATENTS

| 1,702,723 | De Boer | Feb. 19, 1929 |
| 1,756,013 | Jackson | Apr. 29, 1930 |
| 1,947,282 | Theis | Feb. 13, 1934 |
| 2,276,215 | Lehmann | Mar. 10, 1942 |
| 2,310,701 | Lehmann | Feb. 9, 1943 |
| 2,458,559 | Britton | Jan. 11, 1949 |
| 2,557,225 | Hutchinson | June 19, 1951 |
| 2,612,313 | Williamson | Sept. 30, 1952 |